United States Patent

[11] 3,625,871

[72] Inventors Harro Traubel;
 Klaus Konig; Wolfgang Heydkamp, all of Leverkusen; Karl Breer, Cologne, Flittard, all of Germany
[21] Appl. No. 727,171
[22] Filed May 7, 1968
[45] Patented Dec. 7, 1971
[73] Assignee Farbenfabriken Bayer Aktiengesellschaft Leverkusen, Germany
[32] Priority May 12, 1967
[33] Germany
[31] F 52392

[54] PROCESS FOR THE PRODUCTION OF MICROPOROUS SHEET STRUCTURES AND MICROPOROUS SHEET
13 Claims, 1 Drawing Fig.

[52] U.S. Cl. .................................................. 260/2.5 AY,
 117/63, 117/161 KP, 161/159, 161/160, 161/164,
 260/77.5 AX, 260/77.5 CH, 264/41, 264/331,
 264/DIG. 62, 264/DIG. 77
[51] Int. Cl. ...................................................... B29d 27/04,
 C08g 22/00, C08g 22/36, C08g 22/44

[50] Field of Search ............................................ 264/41, 49,
 DIG. 62, DIG. 77, 331; 260/77.5 MP, 2.5 AY, 2.5
 AX, 77.5 CH, 77.5 AX; 117/63, 161 KP; 161/159,
 160, 164

[56] References Cited
UNITED STATES PATENTS

| | | | |
|---|---|---|---|
| 1,663,652 | 3/1928 | Gundlach ..................... | 252/311.5 |
| 3,046,172 | 7/1962 | Reid ............................ | 264/41 UX |
| 3,190,765 | 6/1965 | Yuan ........................... | 264/41 UX |
| 3,281,396 | 10/1966 | Barnes ........................ | 264/41 UX |
| 3,369,925 | 2/1968 | Matsusaita et al. ........... | 264/41 UX |
| 3,388,100 | 6/1968 | Thoma et al. ................ | 264/41 UX |
| 3,449,153 | 6/1969 | Saligny et al. ................ | 264/41 X |

*Primary Examiner*—Philip E. Anderson
*Attorneys*—Clelle W. Upchurch and Robert A. Gerlach ABSTRACT: Microporous sheet structures are prepared by reacting a polymeric polyamine having a molecular weight of from about 350 to about 6000 with substantially an equivalent amount of an organic polyisocyanate in the presence of a nonsolvent for the product, shaping the reaction mixture into a sheet structure before polyaddition is complete and removing the nonsolvent.

PATENTED DEC 7 1971

3,625,871

Figure 1:
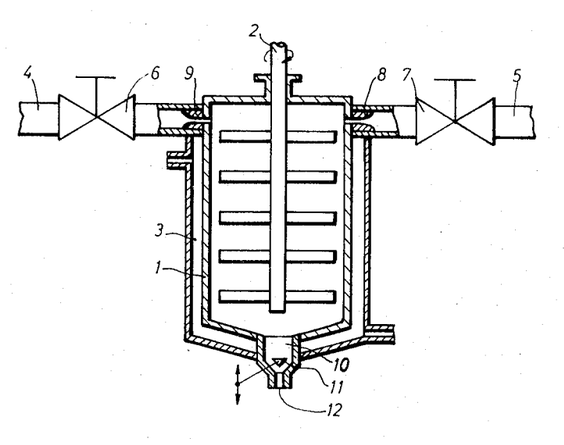

INVENTORS.
HARRO TRÄUBEL, KLAUS KÖNIG, WOLFGANG HEYDKAMP, KARL BREER.

BY *Clelle W Upchurch*

ATTORNEY

PROCESS FOR THE PRODUCTION OF MICROPOROUS SHEET STRUCTURES AND MICROPOROUS SHEET

This invention relates to microporous sheet structures and a method of preparation. More particularly, it relates to microporous sheets prepared by the polyamine-polyisocyanate-polyaddition reaction.

The production of stable aqueous dispersions of completely reacted polyurethanes from isocyanate-containing prepolymers of high molecular weight compounds containing active hydrogen atoms and polyisocyanates, and a diamine as chain lengthening agent, in an aqueous phase, is already known. These stable dispersions of completely reacted polyurethanes are used, for example, in the production of nonporous sheet structures.

It is an object of this invention to provide improved microporous sheet structures. It is another object of this invention to provide an improved method of making microporous sheet structures. It is still another object of this invention to provide an apparatus for conducting the process for preparing microporous sheet structures.

The foregoing objects and others, which will become apparent from the following description and the accompanying drawing showing one embodiment of a mixing apparatus, are accomplished in accordance with the invention, generally speaking, by providing microporous sheet structures by reacting an organic compound having a molecular weight of from about 350 to about 6,000 and at least two amino groups with substantially an equivalent amount of an organic polyisocyanate, the reaction occurring in a nonsolvent for the product, shaping the reaction mixture into a sheet structure by application to a support before the polyaddition reaction is complete and removing the nonsolvent.

More particularly, the microporous sheet structures can be prepared by one of several mixing procedures, for example, (1) the high molecular weight prepolymer containing at least two free basic amino groups, which prepolymer may be dissolved or dispersed in organic solvents, is dispersed in a substance which is a nonsolvent for the polyadduct to be produced, if desired with the addition of low molecular weight polyamines, and mixed with substantially equivalent quantities of a high molecular weight prepolymer that has at least two NCO groups and/or a low molecular weight monomeric polyisocyanate, either of which may optionally be dissolved or dispersed in inert solvents, or (2) higher molecular weight prepolymers containing at least two NCO groups and/or low molecular weight monomeric polyisocyanates, if desired dissolved or dispersed in organic solvents, are dispersed in a substance that is a nonsolvent for the polyadduct to be produced, and mixed with substantially equivalent quantities of a high molecular weight prepolymer which has at least two free basic amino groups, which prepolymer may, if desired, be dissolved or dispersed in organic solvents and may already have had the nonsolvent added to it, if desired with the inclusion of low molecular weight polyamines, or (3) an isocyanate-containing prepolymer and/or low molecular weight monomeric polyisocyanates, if desired dissolved or dispersed in organic solvents, is mixed with substantially equivalent quantities of a high molecular weight prepolymer containing at least two free basic amino groups, which prepolymer is optionally dissolved or dispersed in organic solvents, if desired with inclusion of low molecular weight polyamines, and the above-mentioned high molecular weight prepolymer which has at least two free basic amino groups is at the same time dispersed with a nonsolvent for the polyadduct that is to be produced. The reaction mixture prepared by any of the above three techniques is then applied on supports in such a way that it is at the same time shaped, this application being carried out before the polyaddition reaction is complete, and the polyaddition is completed in the sheet structure on the support, if desired at elevated temperature, preferably at a temperature below the boiling point of the lowest boiling solvent or nonsolvent, and the solvent and nonsolvent are removed during and/or after completion of the polyaddition reaction.

Surprisingly, sheet structures obtainable by the process according to the invention are microporous and permeable to water vapor. The processes known to the art, in which the sheet structures are obtained from polyadducts that are free from isocyanate groups and have already undergone complete reaction, e.g. polyurethane dispersions, in contrast, do not yield porous sheet structures.

The high molecular weight prepolymers containing at least two amino groups to be used according to the invention (hereinafter to be known as preadduct B) can be prepared by numerous, generally well-known methods. For example, one may use high molecular weight amino compounds, e.g. of molecular weight 350 to 6,000 which have two to four reactive amino groups in the molecule. Low molecular weight polyamines may also be included, but in amounts of not more than 50 mols percent based on the high molecular weight prepolymers which have at least two amino groups. High molecular weight, amino-containing prepolymers that have proved to be especially suitable are those compounds which are obtained by addition of excess low molecular weight polyamines or hydrazines in solution, to compounds which carry NCO end groups (hereinafter referred to as prepolymer A) (see DAS 1, 122,254, and 1, 138, 220). The following are examples of low molecular weight polyamines which may be used: ethylene diamine, diethylene triamine and polyethylene polyamines, propylene diamine-(1,3), dipropylene triamine and polypropylene polyamines, tetramethylene diamine-(1,4), pentamethylene diamine-(1,5), hexamethylenediamine-(1,6), dodecamethylenediamine-(1,12) and homologous compounds, N-monoalkylated and N,N'-dialkylated diamines such as N-methyl-1,3-diaminopropane and N,N'-dimethylethylenediamine; cycloaliphatic diamines such as 1,3- and 1,4-hexahydrophenylenediamine, tetrahydronaphthylene diamines, 4,4'diamino-dicyclohexyl-methane, perhydrobenzidine, and 1,5-diaminodecaline; heterocyclic diamines such as piperazine, 2,5-dimethylpiperazine and imidazolidine; aromatic diamines such as 1,3- and 1,4-phenylenediamine, 1,3-, 1,4- and 1,5-naphthylenediamine, benzidine, 4,4'diamino-diphenylmethane, 4,4',4''-triamino-triphenylmethane, toluylenediamines such as 2,4- and 2,6-toluylene-diamine, and any mixtures of these isomers, perhydrogenated 2,4- and 2,6-toluylenediamine and any mixtures of these isomers, as well as monoalkylated derivatives of these compounds which are alkylated on the nucleus and/or monoalkylated on the nitrogen, araliphatic diamines such as 4-aminobenzylamine, aminophenyl ethylamines, N-methyl-p-aminobenzylamine and its homologues, and 1,4-xylylene diamine, hydrazine, hydrazines that are monoalkylated on one or both N-atoms, dicarboxylic acid dihydrazides such as carbodihydrazide, adipic acid dihydrazide, aminocarboxylic acid hydrazides such as aminoacetic acid hydrazide, ε-aminocaproic acid hydrazide, aminobenzoic acid hydrazide, aminosulphhydrazides such as aminobenzylsulphhydrazide and bis-semicarbazides; furthermore, one may use compounds of the formula $H_2N-NH-CO-O-R-O-CO-NH-NH_2$ in which R denotes an alkylene radical having two to 12 carbon atoms, e.g. $H_2N-NH-CO-O-(CH_2)_4-O-CO-NH-NH_2$. The bishydrazide compounds may be prepared e.g. according to U.S. Pat. application No. 712,355 filed Mar. 12. 1968 and assigned to the assignee of the present application. Diamines and bishydrazide compounds are preferably used in the process according to the invention.

The reaction for the preparation of the prepolymer B which has at least two amino groups, is generally carried out as follows: an NCO- containing prepolymer or low molecular weight monomeric polyisocyanate preferably in the form of a solution is added with vigorous stirring to a solution of one of the above-mentioned low molecular weight polyamines which have been placed in a reaction vessel which may be cooled. The method of preparation of suitable NCO-containing prepolymers which are identical with the prepolymers A and of suitable polyisocyanates is described below with reference to the preparation of prepolymer A. The NH/NCO ratio employed in this process should be greater than 1 and is preferably between 1.5/1 and 5./1. If highly reactive polyamines are used, the NH/NCO ratio should be greater than five. The excess of unreacted polyamine may be distilled off subsequently. If, however, one wishes to avoid a large excess of polyamines, the polyamines may, for example, be converted into carbonates or carbamic acid derivatives.

In addition, prepolymers B to be used according to the invention may be products of the type which are readily accessible by reacting prepolymers A with sulfamic acid according to DAS 1,555,907. Another method of synthesizing prepolymers B is mentioned in French Pat. Specification No. 1.415,317 in which prepolymers A are converted by use of formic acid into N-formyl derivatives which yield amino derivatives of the type of prepolymers B after partial saponification. Alternatively secondary or tertiary carbinols may be added to prepolymers A in accordance with Belgian Pat. Specification No. 675,425, and the resulting carbamic acid esters may be decomposed into the corresponding amines by a reaction catalyzed with acid catalyst.

High molecular weight, amino-containing prepolymers B of high reactivity which are particularly suitable for use in the process of the invention are obtained according to DAS 1,215,375 by reacting high molecular weight hydroxyl compounds with ammonia or amines in the presence of catalysts, with application of pressure and heating, or in accordance with U.S. Pat. No. 3,004,989, in which high molecular weight hydroxyl components are reacted with acrylonitrile and then catalytically hydrogenated, or according to published Dutch Application No. 66/01435 by reaction of aminomethyl-5,6-dihydro-(4H) pyran derivatives with high molecular weight hydroxyl components catalyzed with acid catalysts. Lastly, prepolymers B of good reactivity and solubility in organic solvents may be obtained by the process described in U.S. Pat. No. 2,888,439 by addition of nitroaryl isocyanates or according to French Pat. Specification No. 1,474,551 by addition of isocyanatobenzene derivatives to higher molecular weight hydroxyl components, followed by reduction. According to U.S. Pat. Application No. 712,355, filed Mar. 12, 1968 and assigned to the assignee of the present application, high molecular weight compounds which contain terminal OH groups can be reacted with diphenylcarbonate to undergo ester interchange with removal of phenol; carboxylic acid phenol esters react with hydrazine to split off phenol and form hydrazidocarbonic acid esters. These compounds may also be used in the process according to the invention since they carry terminal reactive $NH_2$ GROUPS. All prepolymers B that can be prepared in this way are suitable for use in the process according to the invention.

The following are examples of solvents for the prepolymers B which can also be produced for the preparation of the latter; aromatic hydrocarbons such as benzene, toluene and sylene; commercial solvent mixtures such as Sangajol; cycloaliphatic hydrocarbons such as cyclohexane, methylcyclohexane, tetralin, decalin and turpentine; chlorinated hydrocarbons such as methylene chloride, chloroform, carbon tetrachloride, dichloroethylene, trichloroethylene, perchloroethylene, tetrachloroethane, dichloropropane, chlorocyclohexane and chlorobenzene; esters such as methyl acetate, ethyl acetate, propyl acetate, butyl acetate, formic acid esters, glycol acetate, ethylene glycol monomethylether acetate, and ethylene glycol monoethylether acetate: ketones such as acetone, butanone-(2), pentanone-(2), cyclohexanone, and methylcyclohexanone; esters such as di-n-propyl ether, diisopropyl ether, di-n-butylether, anisole, phenetole, tetrahydrofuran, dioxane and furan; nitro compounds such as nitromethane and nitrobenzene; furthermore, one may use dimethylformamide, dimethylsulfoxide alcohols such as methanol, ethanol, propanol, butanol, cyclohexanol, ethylene glycol ethers, methyl ethers, ethyl ethers, propyl ethers and in special cases also water. Either solutions or dispersions are obtained, depending on the choice of starting compounds, concentration and polarity of the solvents.

If solvents capable of reacting with isocyanate groups or basic amino groups are used, the preparation and subsequent working up of the prepolymers which contain NH groups or NCO groups should be carried out before the solvent reacts with the compounds.

The following are examples of nonsolvents for the polyadduct which is to be prepared from prepolymer B: aliphatic hydrocarbons such as hexane, heptane and octane; commercial solvent mixtures which may also contain some aromatic constituents, such as petroleum ether, ligroin, cleaning petrol and mineral spirits; glycols such as ethylene glycol, propanediol-(1,3) and -(1,2) and butanediol-(1,4); alcohols such as methanol and ethanol, and ethers such as isopropyl ether and diisobutyl ether; water is used for preference.

According to the invention, the nonsolvents chosen should have a vaporization number at least 1½ times and preferably more than 2½ times that of the solvent used if any. If no solvent is used, the vaporization number is generally above four. Determination of the vaporization number is described in DIN 53 170.

Prepolymer A is prepared by reacting a polyisocyanate with a high molecular weight compound which contains active hydrogen atoms. The following are examples of suitable high molecular weight compounds which contain active hydrogen atoms: polyesters or polyester amides which can be prepared by known methods from hydroxycarboxylic acids, dicarboxylic acids, polyols, polyamines, hydrazines, aminoalcohols or aminocarboxylic acids. The following are examples of acids which may be used: hydroxy-caproic acid, malonic acid, succinic acid, adipic acid, methyladipic acid, sebacic acid, thiodipropionic acid, maleic acid, phthalic acid and terephthalic acid. The following are examples of suitable polyols: ethylene glycol, di-, tri- and polyethylene glycols, polypropylene glycols, butanediol-(1,3) and -(1,4), hexanediol-(1,6), acetals produced by the reaction of glycols with formaldehyde, glycerol, pentaerythritol, trimethylolpropane and hexanetriol-(1,2,6). The following are examples of suitable amines: ethylene diamine, tetramethylene diamine-(1,4), hexamethylenediamine-(1,6), piperazine, 1,3- and 1,4-phenylenediamine, ethanolamino, propanolamine and N-methyl-diethanolamine.

One may also use polyethers, which are obtainable for example by the addition of alkylene oxides such as ethylene oxide or propylene oxide to water, hydrogen sulfide ammonia or polygols such as ethylene glycols, propanediol- 1,3) and - (1,2), trimethylolpropane, glycerol and di(hydroxyalkyl) alkylamines, in which case several alkylene oxides may react simultaneously or successively. Furthermore, polythioethers prepared e.g. by condensation of thiodiglycol with itself or by reaction with alkylene oxides, may also be used.

Polyacetals, such as those obtained for example by the reaction of hexanediol-(1,6) with formaldehyde, may also be used as starting materials in the preparation of prepolymers A, as may also siloxanes, which are prepared e.g. from dialkylsilicone dihalides with water.

The molecular weight of the above-mentioned high molecular weight compounds which contain active hydrogen atoms is generally from 500 to 10,000.

The following are examples of suitable polyisocyanates: 1,4-tetramethylene diisocyanate and 1,6-hexamethylene diisocyanate, 1,4-cyclohexanediisocyanate, m- and p-phenylene diisocyanate, 2,4- and 2,6-toluylene diisocyanate and any mixtures of these isomers as well as the corresponding hydrogenation products, p-xylylene diisocyanate, 4,4'-diphenylether-diisocyanate, 4,4'-diphenylsulphone-diisocyanate, 4,4'-diphenylmethane diisocyanate, 2,2'-di-(p-isocyanato-phenyl)-propane, 3,3'-dimethyldiphenylmethane-4,4'-diisocyanate, 3,3'-dichlorodiphenylmethane-4,4'-diisocyanate, 1,5-naphthylene diisocyanate, 4,4',4''-triphenylmethane-triisocyanate, tri-p-isocyanato-phenyl thiophosphate, the reaction product of 1 mol of trimethylpropane and 3 mols of toluylene diisocyanate-(2,4), and the reaction product of 3 mols of 1,6-hexamethylene diisocyanate and 1 mol of water, having the formula $OCN-(CH_2)_6-N(CONH-(CH_2)_6NCO)_2$. Diisocyanates are preferred.

The high molecular weight, isocyanate-containing prepolymers used according to the invention are preferably reaction products of polyhydroxyl compounds with monomeric polyisocyanates.

The isocyanate-containing prepolymers are prepared in known manner by heating the reactants. The NCO/OH ratio is invariably greater than one but should as a rule not be greater than 10. A still greater excess of polyisocyanate may, of course, also be used, but the same result is obtained by adding monomeric polyisocyanate subsequently to the prepolymer. The prepolymers are generally of oily or waxy consistency, depending on the choice of starting components The solvents for these prepolymers B are generally known, and as a rule not soluble e.g. in aliphatic hydrocarbons. If the NCO/OH ratio is greater than two, the prepolymers obtained are on the whole not chain lengthened whereas NCO/OH ratios less than two result in an increase in the average molecular weight of the prepolymers. Low molecular weight glycols such as those mentioned above by way of example in the list of polyester components may also be used in part as chain lengthening agents for the preparation of the prepolymers in addition to the higher molecular weight starting compounds; in that case, higher molecular weight preadducts are again obtained.

To carry out the process according to the invention, the nonsolvent is first added, with vigorous stirring and if desired at low temperature, to the amino-containing prepolymer which may be present in the form of an organic solution or dispersion. The viscosity increases in this operation. An NCO-containing prepolymer, if desired in solution or dispersion, and/or a polyisocyanate is added to the resulting dispersion of the water-in-oil type, again with stirring. Alternatively, the high molecular weight prepolymer containing at least two NCO groups and/or low molecular weight monomeric polyisocyanate, optionally dissolved or dispersed in an organic solvent, may be placed in a reaction vessel and the nonsolvent is then added with vigorous stirring. Substantially equivalent quantities of the high molecular weight prepolymer which has at least two free basic amino groups, which prepolymer may be dissolved or dispersed in organic solvents and may already have nonsolvent added to it, is then added to and mixed with the reaction mixture, if desired together with low molecular weight polyamines or hydrazines. Alternatively, the isocyanate-containing prepolymer is dissolved or dispersed in an organic solvent, and/or low molecular weight monomeric polyisocyanate, and the high molecular weight prepolymer containing at least two free basic amino groups may be mixed together and the nonsolvent at the same time added with vigorous stirring so that dispersion takes place. Before polyaddition is completed, the reaction mixture, which is still pourable, is applied to supports and thus shaped. Polyaddition is then completed, preferably at elevated temperature, preferably above 50° C. Complete removal of the mixture of solvent and nonsolvent is effected e.g. by evaporation, under vacuum if required, or by flushing out from the resulting sheet structures.

To avoid incorporation of air bubbles in the sheet structures, which would impair the homogeneity of the sheet structure both as regards its appearance and as regards its porosity and permeability to water vapor, it is advantageous to mix the components in a chamber that is free from a gaseous phase.

In order to achieve very thorough mixing of the components and, as a result thereof, to improve the homogeneity of the resulting sheet structures, the components that are to be mixed are advantageously introduced at pressures of the order of up to 300 kg./cm.$^2$ into the chamber that is free from a gaseous phase. The choice of pressure at which the components are introduced depends largely on the viscosity of the individual components. According to the invention, the components are mixed at a pressure of 0.01 kg./cm.$^2$ to 30 kg./cm.$^2$. The choice of pressure at which mixing is carried out depends not only on the viscosities but also on the reactivity of the components. The mixing time in the same way influences the homogeneity of the resulting mixture and can be chosen to lie within a time interval of between 1/5,000 second and 10 seconds, depending on the viscosity and reactivity of the components and the special nature of the mixing apparatus, taking into account the pressure at which the components are introduced and the pressure at which they are mixed. According to the invention, the reaction of the components can be retarded or accelerated by approximately adjusting the temperature of the mixing process by cooling or by supply of heat. An especially uniform sheet structure is advantageously obtained by spraying the finished mixture on the support through nozzles.

An apparatus for carrying out the process is characterized by a mixing chamber sealed off from the external atmosphere and having inlets for the introduction of the reaction components and an outlet aperture. This arrangement insures that no air will be present in the mixing chamber during the mixing process, which could emulsify the mixture and cause the formation of bubbles. The mixing chamber may be equipped with a mechanical stirrer rotating at a speed of 100 to 10,000 revs/min., depending on the type of components admitted.

Mixing chambers of similar construction are already known in polyurethane chemistry for use in the production of foam plastics, but when apparatus of this type is used for known purposes the presence of air during mixing of the components does not matter. In actual fact, air is purposely introduced into the mixing chamber.

According to the invention, the inlets for the components are advantageously provided with nozzles to insure better distribution and mixing of the components. By suitably adjusting the direction of injection of two or more nozzles, for example, used for injecting certain components that are difficult to mix, an additional mixing effect can be achieved which, particularly, serves to mix these compounds. In fact, a stirrer is not always necessary if the components are sufficiently mixed, for example by currents set up as a result of their being injected into the mixing chamber. Of course, the two methods may be combined. Open or closed direct flow or counterflow nozzles suitable for this purpose which are already known may be used as injection nozzles. The cross section of the outlet aperture of the mixing chamber is advantageously adjustable so that the mixing pressure in the mixing chamber can thereby be regulated in the simplest manner. Valves of variable cross section of flow, for example, may be used for this purpose, or alternatively replaceable nozzles of different cross sections of flow may be screwed into the outlet aperture. The inner wall of the mixing chamber is kept as smooth as possible to prevent the formation of deposits. Similarly, if a stirrer is employed this should also be so constructed that formation of deposits is avoided. A pin stirrer has proved to be advantageous for this. The volumetric capacity required for the mixing chamber depends to a certain extent on the length of stay of the components and their rate of through-put.

An apparatus for carrying out the process will now be explained with the aid of an embodiment given by way of example and described with reference to a drawing.

The mixing chamber 1 is equipped with pin stirrers 2 and surrounded externally by a tempering device 3. The inlet pipes 4 and 5 are provided with shut-off taps 6 and 7 and have injection nozzles 8 and 9. The outlet 10 is provided with a cone valve 11 of adjustable cross section which is joined to the nozzle 12.

The porosity and mechanical properties of the products of the process are largely determined not only the starting materials and the NCO/NH ratio but also by the proportion of solvents and above all by the extent of polyaddition before the shaping operation.

The combination which is most suitable and the proportions of starting compounds required to give a polyadduct with suitable properties, can be determined by a preliminary test in the homogeneous phase. The solution of prepolymer containing amino groups is reacted with the appropriate isocyanate component in a solvent for the polyurethane that is to be formed, the solvent is evaporated, and the homogeneous film that has been formed is tested.

In order to obtain polyaddition products with as high a molecular weight as possible, it is preferred to react approximately stoichiometric quantities of basic component and isocyanate component. In principle, the NCO/NH ratio can be varied to a great extent. Substantial deviations from the stoichiometric amounts generally lead to products of inferior quality.

The porosity of the products generally increases with the quantity of nonsolvent; as much nonsolvent as possible should therefore be introduced into the dispersion. Since the viscosity rises sharply with increasing quantities of nonsolvent, the dispersion may become unstable and break, and the optimum quantity of nonsolvent is advantageously determined in a preliminary test.

The course of the polyaddition reaction depends on the reactivity of the starting components as well as on the stirring time. The stirring time should be sufficient to insure thorough mixing of the dispersion of the amino containing prepolymer B with the isocyanate component. If the stirring time is too prolonged, the reaction mixture may become solid. The optimum stirring time is therefore determined in a preliminary test. The course of the polyaddition reaction of a given system can be followed e.g. spectroscopically (determination of the NCO absorption) or volumetrically (stopping the reaction with hydrochloric acid and back titration with sodium hydroxide solution).

The polyaddition reaction can be accelerated by known catalysts (see J. H. Saunders, K. C. Frisch. *Polyurethanes, CHEMISTRY and Technology*, New York 1962, page 212). In addition to the catalysts, the reaction temperature also influences the rate of polyaddition. The reactants, prepolymer B and prepolymer A and/or monomeric polyisocyanate, are generally mixed at room temperature or below this and polyaddition is completed at elevated temperature.

In the process according to the invention, emulsifiers such as fatty alcohol sulfonates ethoxylated phenols, salts of fatty acids or quaternated amines of paraffins may be used. As a rule, however, emulsifiers are not employed.

Fillers such as precipitated silicic acid, silicon dioxide or bentonite should, if employed, as far as possible added to the prepolymer B or to its solution prior to dispersion or stirred up in the mixture of solvent and nonsolvent and added in this form to the dispersion. The quantity of filler should generally not exceed 50 percent by weight, preferably 25 percent by weight, based on the polyadduct.

Another advantage of the process is that both water-soluble dyes and dyes that are only soluble in organic solvent can be included for coloring the products of the process. The dye is dissolved either in the organic phase or in water, depending on its solubility; it is preferably added before the preparation of the dispersion. Pigments may, for example, be stirred up in the organic phase; when the nonsolvent is dispersed in the reaction mixture, the pigments become distributed in the dispersion. The pigments may, of course, also be added to the organic phase or dispersion in the form of an aqueous suspension, if desired in the presence of thickening agents such as carboxymethylcellulose. The said dyes may also be used to color the finished products of the process.

Other high molecular weight compounds may also be added to the solution or dispersion of the prepolymer B or to the isocyanate component in order to modify the polyadducts which are to be produced. These high molecular weight compounds may be added in finely divided, solid form or in solution.

Examples of high molecular weight compounds which may be added are such as polyvinyl chloride, polyvinyl acetate, polyvinyl alcohol, polyethylene, polystyrene, polyacrylonitrile, polymers of acrylonitrile, butadiene and styrene, polyamides and polyurethanes. Stabilizers or light protective agents may also be added.

The microporous polyadducts may, in addition, be cross-linked. Cross-linking agents may be added to the reaction mixture or to the finished microporous film.

Suitable cross-linking agents are, for example, formaldehyde, compounds which split off formaldehyde, and peroxides. Cross-linking with polyisocyanates is preferably carried out on the finished microporous film, when the film is dipped into the solution or dispersion of a polyisocyanate and may be heated to elevated temperature, if desired in the presence of catalysts.

The polyadducts may be applied to porous or nonporous supports. Examples of porous supports are knitted fabrics, woven fabrics, fleeces, felts and split leather. Nonporous substrates such as glass plates, metal bands, if desired with the negative of a surface impregnation, or webs of paper or woven fabric coated with perfluoropolyethylene, are used when it is desired to obtain porous sheet structures which are to be transferred by the usual reversing processes to porous supports, e.g. by adhesion. By this method one may coat supports such as wood, split leather, cardboard, paper and woven or unwoven textile sheets.

Microporous sheet structures with good mechanical properties, very good flexibility and excellent resistance to solvents can be produced by the process according to the invention. By using the process according to the invention one can easily produce sheet structures from polyurethane ureas that are very difficult if not impossible to prepare by conventional processes, such as reacting isocyanate-containing prepolymers and polyamines in solution or in the melt.

The microporous sheet structures obtained can be finished by methods normally used for genuine or artificial leather. They may, for example, advantageously be used in the production of leather substitutes or as diaphragms.

The invention will be further illustrated by the following examples in which parts are by weight unless otherwise specified.

Preparation of isocyanate-containing prepolymers
(Prepolymer A)

A 1

About 2,000 parts of linear polypropylene glycol ether of molecular weight 2,000 are mixed with about 336 parts of 1,6-hexamethylene- diisocyanate and heated to about 110° C. until the free isocyanate group content has dropped to 3.5 percent by weight, which requires about 8 to 9 hours. A pale yellow oil of viscosity 2125 cP/25° C. is obtained.

A 2

About 250 parts of 4,4-diphenylmethane diisocyanate are added to about 1,000 parts of a linear polypropylene glycol of molecular weight 1,000, and the reaction mixture is heated to about 80° C. for about 6 hours. A viscous yellow oil is obtained which contains 3.3 percent by weight of free isocyanate groups.

A 3

About 1,700 parts of polyester of adipic acid and a mixture of hexanediol-(1,6) and 2,2-dimethylpropanediol-(1,3) in the ratio of 65:35, molecular weight 1,700, OH number 66, are heated to about 80° C., and about 348 parts of toluylene-2,4-diisocyanate are added. After about 190 minutes at about 80° C., the NCO content has dropped to 4.1 percent by weight. A pasty, pale yellow product is obtained.

The prepolymers containing the NCO groups indicated below were prepared analogously to A 1 to A 3 from the components indicated

| No. | Higher molecular weight compound having at least two active hydrogen atoms | Polyisocyanate | Molar ratio | Free NCO group content (percent by weight) | Consistency or viscosity |
|---|---|---|---|---|---|
| A 4 | Linear polypropylene glycol ether molecular weight 2,000, OH number 56. | 1,6-hexamethylene diisocyanate | 1:3.5 | 7.74 | Colorless oil. |
| A 5 | do | Isometic mixture tolyulene-2,4- and toluylene-2,6-diisocyanate (80:20% by weight). | 1:2 | 3.8 | Viscous oil. |
| A 6 | do | do | 1:3 | 6.38 | Yellow oil. |

| No. | Higher molecular weight compound having at least two active hydrogen atoms | Polyisocyanate | Molar ratio | Free NCO group content (percent by weight) | Consistency or viscosity |
|---|---|---|---|---|---|
| A 7 | do | | 1:3.5 | 7.32 | Do. |
| A 8 | do | 4,4'-diphenylmethane diisocyanate | 1:1.5 | 1.64 | Yellow resin. |
| A 9 | do | do | 1:3 | 6.2 | Do. |
| A 10 | Linear polypropylene glycol ether molecular weight 1,000, OH number 112. | Isomeric mixture toluylene-2,4- and toluylene-2,6-diisocyanate (80%:20 by weight). | 1:2 | 5.9 | Do. |
| A 11 | Mixture of a polysiloxane of the formula HO—CH$_2$—(Si(CH$_3$)$_2$—O)$_{12}$—Si(CH$_3$)$_2$—CH$_2$OH and a linear polypropylene glycol ether, molecular weight 2,000, OH number 56, in the molar ratio 1:3. | 4,4'-diphenylmethane diisocyanate | 1:2 | 3.68 | Do. |
| A 12 | Polysiloxane according to A 11 | 1,6-hexamethylene diisocyanate | 1:2 | 5.3 | 102 cP/25° C. |
| A 13 | Polypropylene-polyethylene glycol ether (prepared by alternating poly-addition of 75 parts by weight of propylene oxide and 25 parts by weight of ethylene oxide) molecular weight 2,150, OH number 52. | 4,4'diphenylmethane diisocyanate | 1:2 | 3.08 | Yellow resin. |
| A 14 | Mixed polyether of 80 parts by weight of propylene oxide and 20 parts by weight of ethylene oxide, molecular weight 4,150, OH number 27. | 1,6-hexamethylene diisocyanate | 1:2 | 2.5 | 1,875 cP/25° C. |
| A 15 | Polytetramethylene glycol ether molecular weight 2,660, OH number 42. | do | 1:2 | 2.68 | Waxy. |
| A 16 | Polytetramethylene glycol ether molecular weight 1,320, OH number 85. | do | 1:1.5 | 2.2 | Do. |
| A 17 | do | 4,4'-diphenylmethane diisocyanate | 1:1.33 | 1.46 | Do. |
| A 18 | Polythioether (prepared by condensation of 70 parts by weight of thiodiglycol and 30 parts by weight of 1,6-hexanediol) molecular weight 1,570, OH number 71.5. | do | 1:2 | 3.78 | Yellow resin. |
| A 19 | Polyester of adipic acid and a mixture of 65 parts by weight of hexanediol-(1,6) and 35 parts by weight of 2,2'-dimethyl propanediol-(1,3), molecular weight 1,700, OH number 66. | 1,6-hexamethylene diisocyanate | 1:2 | 4.1 | Salvy. |
| A 20 | Polyester of adipic acid and a mixture of 1,6-hexanediol and 2,2'-dimethylpropanediol-(1,3) in the molar ratio of 11:6, molecular weight 1,870, OH number 62. | 4,4'-diphenylmethane diisocyanate | 1:1.5 | 1.8 | Do. |
| A 21 | do | 2,2'-diphenylpropane-4,4'-diisocyanate | 1:2 | 3.42 | Do. |
| A 22 | Polyester of adipic acid and diethylene glycol, molecular weight 600, OH number 187. | Isomeric mixture of toluylene-2,4- and toluylene-2,6-diisocyanate (80:20 percent by weight). | 1:2 | 10.6 | Highly viscous. |

Preparation of prepolymers containing amino groups (prepolymer B)

B 1

About 24.8 parts of 4-aminophenylethylamine (0.183 mol) in about 225 parts of benzene are introduced into a glass beaker, and a solution of about 200 parts of prepolymer A 2 (0.183 mol NCO) in about 300 parts of benzene is run in with vigorous stirring (plate stirrers, 2,700 revs/min). at 5 to 10° C. in the course of about 30 minutes. A milky, 30 percent solution is obtained which contains 0.244 mmol amino groups per part.

B 2

About 8.5 parts hydrazine hydrate (0.163 mol) in about 176 parts of xylene are placed into a reaction vessel. A solution of about 200 parts of prepolymer A 2 (0.163 mol NCO) in about 250 parts of xylene are run in with vigorous stirring at about 0° C. A thick liquid 33.3 percent dispersion containing 0.2 mmol of semicarbazide groups per part is obtained.

B 3

A solution of about 200 parts of prepolymer A 1 (0.1685 mol NCO) in about 490 parts of toluene are run into a solution of about 44.5 parts of tetramethylene diamine (0.505 mol) in about 245 parts of toluene at about 0° C. in the course of about 15 minutes. The thickly viscous end product contains 0.86 mmol of amino groups per part.

The prepolymers containing the amino groups indicated below were prepared in a manner analogous to B 1 to B 3 from the components indicated.

| No. | Prepolymer A No. | Diamine | NCO/NH ratio | Solvent | Content, percent by weight | Active NH (mmol/part) |
|---|---|---|---|---|---|---|
| B 4 | A 10 | Hydrazine | 1:2 | Benzene | 50 | 0.687 |
| B 5 | A 5 | do | 1:2 | do | 50 | 0.44 |
| B 6 | A 7 | do | 1:2 | do | 50 | 0.825 |
| B 7 | A 1 | do | 1:2 | do | 50 | 0.465 |
| B 8 | A 6 | do | 1:2 | do | 50 | 0.707 |
| B 9 | A 4 | do | 1:2 | do | 50 | 0.87 |
| B 10 | A 1 | do | 1:2 | Cleaning petrol toluene 2:1 | 40 | 0.327 |
| B 11 | A 15 | do | 1:2 | Toluene | 33.3 | 0.208 |
| B 12 | A 17 | do | 1:2 | do | 33.3 | 0.115 |
| B 13 | A 20 | do | 1:2 | do | 33.3 | 0.141 |
| B 14 | A 13 | do | 1:2 | do | 33.3 | 0.357 |
| B 15 | A 6 | Methylhydrazine | 1:2 | Benzene | 50 | 0.695 |
| B 16 | A 2 | 4-aminophenylethylamine | 1:2 | Tetrahydrofuran | 50 | 0.406 |
| B 17 | A 9 | do | 1:2 | do | 30 | 0.363 |
| B 18 | A 8 | do | 1:2 | Benzene | 40 | 0.155 |
| B 19 | A 8 | do | 1:2 | Tetrahydrofuran | 40 | 0.155 |
| B 20 | A 15 | do | 1:2 | Diisopropylether | 33.3 | 0.195 |
| B 21 | A 16 | do | 1:2 | Ethyl acetate | 33.3 | 0.163 |
| B 22 | A 18 | do | 1:2 | Toluene | 33.3 | 0.267 |
| B 23 | A 8 | do | 1:2 | Benzene | 50 | 0.198 |
| B 24 | A 11 | do | 1:2 | Dichloromethane | 50 | 0.391 |
| B 25 | A 2 | do | 5:6 | Dimethylformamide | 33.3 | 0.0485 |
| B 26 | A 2 | Methyl-4-aminobenzylamine | 1:2 | Benzene | 30 | 0.244 |
| B 27 | A 9 | do | 1:2 | do | 20 | 0.242 |
| B 28 | A 8 | do | 1:2 | do | 50 | 0.185 |
| B 29 | A 6 | do | 1:2 | do | 50 | 0.628 |
| B 30 | A 1 | Tetrahydronaphthylenediamine-(1,5) | 1:2 | do | 20 | 0.142 |
| B 31 | A 15 | Piperazine [1] | 1:2 | Isopropanol | 33.3 | 0.196 |

[1] The diamine was converted into the carbonate before the reaction with prepolymer A.

B 32

About 1,950 parts (1.0 mol) of polypropylene glycol-(1,2) ether are added to about 328.5 parts (2.0 mol) if distilled p-nitrophenyl isocyanate in about 1,500 parts by volume of tetrahydrofuran, and the reaction mixture is stirred for about 2 hours at the boiling point of the solvent. After the addition of Raney nickel, the reaction mixture is hydrogenated at about 100° C./500 excess atmospheres H$_2$ and filtered and the solvent is evaporated off under reduced pressure. The yield of diamine is more than 99 percent of the theoretical, NH number 50.5.

B 33

A prepolymer is prepared from about 1,000 parts (0.5 mol) of polypropylene glycol-(1,2) ether and about 420 parts of 1,6-hexamethylene diisocyanate by heating to about 100° C. for about 2 hours, and the prepolymer is freed from excess diisocyanate by thin layer evaporation (135° C. bath temperature/0.08 mm. Hg). Analysis shows an NCO-content of 3.03 percent by weight.

About 85.2 parts (1.0 mol) of about β-cyanoethylhydrazine are dissolved in 1,500 parts by volume of tetrahydrofuran in a vessel equipped with stirrer, and about 1,380 parts (0.5 mol) of the prepolymer which contains NCO end groups is added in about 1,000 parts by volume of tetrahydrofuran over about 2 hours at about 0° C. AFter stirring for about 3 hours at room temperature, the solvent is removed by distillation under a vacuum in the final stages, of up to about 2 mm. Hg. End group analysis shows that the pale yellow, tough viscous material produced has a molecular weight of 2,930 (calculated 2,945) and an N content of 4.73 percent by weight (calculated 4.76 percent by weight).

B 34

About 1,940 parts (1 mol) of an addition product prepared from a polyester of adipic acid and 1,6-hexanediol (molecular weight 850) and toluylene diisocyanate (2,4-:2,6-isomer mixture = 65:35 percent by weight) are heated with about 428 parts (2 mols) of diphenyl carbonate at 12 mm. Hg for about 30 minutes to about 150° C. The temperature is then raised to about 225° C. in the course of about 1 hour at about 100 mm. Hg. Phenol liberated during the reaction (192 parts = 2.04 mol) is then distilled off at about 12 mm. Hg. and a bath temperature of about 180° C. About 100 parts (2 mol) of hydrazine hydrate are then added at about 180° C., the reaction mixture is stirred for a further 90 minutes at about 80° C., and about 35 parts (1.95 mol of water are distilled off at 12 mm. Hg., followed by about 182 parts (1.94 mol) of phenol at 0.1 mm. Hg, bath temperature about 110 to about 150° C.

A yellowish wax of softening point 40° C. is obtained.

PROCESS ACCORDING TO THE INVENTION

Example 1

A. About 46 parts (40 mmol NH$_2$) of the prepolymer prepared according to B 9 are diluted with about 100 parts of benzene and stirred to form a homogenous solution. About 450 parts by volume of water are added to the solution of at a rate of about 5 parts by volume per second by means of a stirrer apparatus (Ekato Labormix 26) to which a plate stirrer is attached which rotates at 4,000 revs/min., and a dispersion of water in the solution of prepolymer B in benzene is thus prepared.

B. About 42 parts (40 mmol NCO) of the prepolymer prepared according to A 1 are mixed with about 100 parts of benzene and dispersed with about 200 parts by volume of water and under conditions similar to those indicated under A.

The dispersion prepared according to B is poured into the dispersion prepared according to A. After stirring for about 15 seconds, the reaction mixture is poured on to glass plates 2,000 cm.$^2$ in size, and the polyurethane is prepared at about 80° C., the solvent evaporating at the same time. The resulting microporous film, 0.5 mm. in thickness, has a permeability to water vapor of 1 mg./hour/cm.$^2$, a tensile strength of 40 kp/cm.$^2$ an elongation at break of 140 percent and a resistance to tearing of 8.4 kp/cm.

Example 2

In a manner analogous to example 1, about 22.7 parts (10 mmol NH$_2$) of the product prepared according to B 5 are treated with about 20 parts of benzene, and about 50 parts by volume of water are dispersed in this liquid.

A dispersion of about 10 parts by volume of 0.5 molar solution of 1,6-hexamethylene diisocyanate in benzene with about 50 parts by volume of water is prepared and this dispersion of the prepolymer B5 is introduced with stirring. After stirring for about 20 seconds the dispersion is poured on to glass plates 800 cm.$^2$ in size, and the solvent is evaporated at about 75° C. A microporous film is formed which has a permeability to water vapor of 4.6 mg./h./cm.$^2$ and a tear resistance of 9 kp/cm.

Example 3

About 38 parts (10 mmol NH$_2$) of the prepolymer prepare according to B 2 are dissolved in about 30 parts of benzene. About 350 parts by volume of water are dispersed in this solution at a rate of about 1 parts by volume per second by means of a stirrer apparatus (Ekato Labormix 26 (Ekato mixer stirrer) operating at 6,000 revs/min. About 50 parts by volume (10 mmol NCO) of a 0.2 molar solution of prepolymer A 14 in benzene are run into this dispersion, and after stirring for about 15 seconds the reaction mixture is poured on to a studded metal matrix 2,000 cm.$^2$ in area. Polyaddition is completed at about 80° C. while the solvent evaporates. A microporous film is produced which has a permeability to water vapor of 1.8 mg./h./cm.$^2$ Examples 4 to 7 are carried out in a manner analogous to example 3.

| Ex. | Prepolymer B used | Quantity of prepolymer B used (parts) | NH$_2$, mmol | Solvent added | Quantity of solvent (parts) | Quantity of water dispersed (parts by volume) | Prepolymer A used | 0.2 molar solution of the prepolymer (parts by volume) | NCO of the solution of preadduct A, mmol | Stirring time (sec.) | Reaction temp. (° C.) | Permeability to water vapor (mg./h. cm.$^2$) |
|---|---|---|---|---|---|---|---|---|---|---|---|---|
| 4 | B 7 | 10.8 | 5 | Ethyl acetate | 20 | 100 | A 19 | 25 benzene | 5 | 15 | 75 | 1.1 |
| 5 | B 21 | 50 | 8 | do | 40 | 150 | A 3 | 40 benzene | 8 | 10 | 80 | 1.2 |
| 6 | B 22 | 37.5 | 10 | Toluene | 40 | 100 | A 3 | 50 benzene | 10 | 10 | 80 | 1 |
| 7 | B 1 | 41 | 10 | Benzene | 50 | 250 | A 3 | 25 benzene | 5 | 30 | 80 | 16 |

Example 8

About 250 parts by volume of water are dispersed in about 29.2 parts (20 mmol NH$_2$) of prepolymer B prepared according to B 4 and about 30 parts of benzene. A mixture of about 10 parts by volume of 0.5 molar solution of 1,6-hexamethylene diisocyanate (10 mmol NCO) and about 25 parts by volume of 0.2 molar solution in benzene (10 mmol NCO) of prepolymer A prepared according to A 12 is added to this dispersion, and after stirring for about 15 seconds, the resulting product is poured on to a silicone matrix which has a surface area of 680 cm.$^2$ around the edge of which it is beaded. Polyaddition is completed at about 75° C. while the solvent evaporates. The resulting microporous sheet structure has a permeabilty to water vapor of 15.2 mg./h./cm.$^2$.

Examples 9 to 16 are carried out according to example 8.

| Ex. | Preadduct B used | Quantity of prepolymer B used (parts) | NH$_2$, mmol | Solvent added | Quantity of solvent (parts) | Water incorporated by dispersion (parts by volume) | Prepolymer A used | 0.2 molar solution prepolymer A in benzene (parts by volume) |
|---|---|---|---|---|---|---|---|---|
| 9 | B 5 | 22.7 | 10 | Benzene | 20 | 100 | A 14 | 25 |
| 10 | B 8 | 14.7 | 10 | do | 10 | 100 | A 1 | 25 |
| 11 | B 10 | 23.9 | 10 | Ethyl acetate | 20 | 150 | A 1 | (¹) |
| 12 | B 26 | 41 | 10 | do | 20 | 150 | A 3 | 25 |
| 13 | B 19 | 51.7 | 10 | do | 40 | 150 | A 3 | 25 |
| 14 | B 11 | 48 | 10 | do | 100 | 250 | A 19 | 25 |
| 15 | B 20 | 52 | 10 | Di-n-propyl ether | 50 | 150 | A 19 | 25 |
| 16 | B 17 | 82 | 29 | Benzene | 50 | 250 | A 3 | 25 |

¹ 15.1 parts of prepolymer A dissolved in 1,6-hexamethylene diisocyanate solution added to the B 10 dispersion.

| Example | NCO of the solution of prepolymer A, mmol | Polyisocyanate | 1 molar solution in benzene (parts by volume) | NCO of the solution of polyisocyanate in benzene, mmol | Stirring time (sec.) | Reaction temp. (° C.) | Resistance to tear propagation (kp./cm.) | Permeability to water vapor (mg./h./cm.$^2$) |
|---|---|---|---|---|---|---|---|---|
| 9 | 5 | 1,6-hexamethylene diisocyanate | 2.5 | 5 | 30 | 75 | 19 | 1.1 |
| 10 | 5 | do | 2.5 | 5 | 15 | 75 | 5 | 0.8 |
| 11 | 5 | do | 2.5 | 5 | 8 | 75 | | 0.8 |
| 12 | 5 | 4,4'-diphenylmethane diisocyanate | 2.5 | 5 | 60 | 75 | 5 | 0.8 |
| 13 | 5 | do | 2.5 | 5 | 8 | 75 | | 3 |
| 14 | 5 | 1,6-hexamethylene diisocyanate | 2.5 | 5 | 10 | 75 | | 1 |
| 15 | 5 | do | 2.5 | 5 | 10 | 80 | | 15 |
| 16 | 5 | 4,4'-diphenylmethane diisocyanate | 5 | 10 | 5 | 75 | | 5 |

Example 17

About 50 parts of isopropanol are added to about 50 parts (10 mmol NH$_2$) of a prepolymer prepared according to B 13, and about 60 parts by volume of water are dispersed in this. About 5 parts by volume 0.2 molar 1,6-hexamethylene diisocyanate solution in benzene (10 mmol NCO) are added to this dispersion, and the dispersion is stirred for about 10 seconds and poured on to glass plates 2,000 cm.$^2$ in area. After completion of the polyaddition at about 80° C. and removal of the solvent by evaporation, a microporous sheet structure is obtained which has a tensile strength of 80 kp/cm.$^2$, an elongation at break of 400 percent, a tear resistance of 2.3 kp/cm. and a permeability to water vapor of 0.9 mg./h/cm$^2$. The sheet withstands being folded 200,000 times in the Bally Flexometer without damage.

Example 18

By a method similar to that used in example 17, about 20 parts of benzene are added to about 22.7 parts (10 mmol NH$_2$) of a prepolymer prepared according to B 5, and about 50 parts by volume of water are dispersed in this solution. A dispersion of about 5 parts by volume at 0.5 molar benzenic 1,6-hexamethylene diisocyanate solution (10 mmol NCO) in about 50 parts by volume of water is added to the dispersion prepared in this way, and after a stirring time of about 20 seconds the product is poured on to glass plates 680 cm.$^2$ in area. After drying for about 4 hours at about 75° C. in a drying cupboard with circulating air, the film id detached and dried for another 20 minutes. The film has a tear propagation resistance of 9.3 kp/cm. and a permeability to water vapor of 4.6 mg./h./cm$^2$.

Examples 19 to 23 are carried out using the method of example 17.

Example 34

About 50 parts of dimethylformamide and about 20 parts of a 30 percent solution in dimethylformamide of a thermoplastic, partially hydrolyzed cellulose acetate, and about 50 parts of a 12 percent solution in dimethylformamide of a polyurethane prepared from polypropylene glycol ether of molecular weight 2,000, 4,4'-diphenylmethane diisocyanate and p-aminophenylethylamine (NCO/NH ratio = 1.3) are added to about 103 parts (5 mmol NH$_2$) of the prepolymer containing NH$_2$ groups prepared according to B 25. About 5 parts by volume of a 0.5 molar solution of 4,4'-diphenylmethane diisocyanate in benzene are added with vigorous stirring, and the mixture, which becomes viscous, is poured after stirring for about 15 seconds on to glass plates 2,000 cm.$^2$ in area. To accelerate polyaddition, the reaction mixture is exposed to a temperature of about 80° C. for about 30 minutes, and after the plates have cooled the solvent is flushed out by immersion in water. The microporous film obtained has a permeability to water vapor of 6.1 mg./h./cm.$^2$ and can withstand being bent 200,000 times in the Bally Flexometer without damage.

Example 35

About 100 parts by volume of methanol are dispersed in about 44 parts (5 mmol NH$_2$) of the prepolymer prepared according to B 12. After the addition of about 10 parts by volume of a 0.5 molar solution of 1,6-hexamethylene diisocyanate in benzene, the reaction mixture is stirred for about 15 seconds and is then poured on to a glass plate of 680 cm.$^2$ in area. After polyaddition has terminated and the solvent has been evaporated off at about 80° C., a microporous structure is obtained which has a permeability to water vapor of 13.4

| Example | Prepolymer B used | Quantity of prepolymer B used (parts) | NH$_2$, mmol | Solvent added | Quantity of solvent (parts) | Quantity of water dispersed (parts) |
|---|---|---|---|---|---|---|
| 19 | B 15 | 29.8 | 20 | Benzene | 10 | 100 |
| 20 | B 6 | 12.1 | 10 | do | 20 | 100 |
| 21 | B 26 | 41 | 10 | Ethyl acetate | 20 | 150 |
| 22 | B 16 | 24.8 | 10 | do | 40 | 120 |
| 23 | B 1 | 41 | 10 | do | 10 | 150 |
| 24 | B 19 | 51.7 | 10 | do | 40 | 150 |
| 25 | B 27 | 41.3 | 10 | do | 10 | 110 |
| 26 | B 27 | 41.3 | 10 | do | 10 | 110 |
| 27 | B 13 | 71 | 10 | | | 100 |
| 28 | B 28 | 54 | 10 | Benzene | 40 | 250 |
| 29 | B 5 | 22.7 | 10 | do | 30 | 250 |
| 30 | B 28 | 54 | 10 | do | 50 | 250 |
| 31 | B 31 | 50 | 10 | Isopropanol | 50 | 60 |
| 32 | B 30 | 71.5 | 10 | Benzene | 50 | 250 |
| 33 | B 30 | 71.5 | 10 | do | 30 | 250 |

| Example | Polyisocyanate | 1 molar solution in benzene (parts by volume) | NCO of solution of polyisocyanate in benzene, mmol | Stirring time (sec.) | Reaction temp. (° C.) | Permeability to water vapor (mg./h. cm.$^2$) |
|---|---|---|---|---|---|---|
| 19 | 1,5-naphthylene diisocyanate | [1] 10 | 20 | 20 | 110 | 3.7 |
| 20 | 1,6-hexamethylene diisocyanate | 5 | 10 | 20 | 75 | 0.8 |
| 21 | 4,4'-diphenylmethane diisocyanate | 5 | 10 | 45 | 110 | 1 |
| 22 | do | 5 | 10 | 8 | 75 | 7.6 |
| 23 | do | 5 | 10 | 8 | 75 | 5.1 |
| 24 | do | 5 | 10 | 8 | 110 | 4.7 |
| 25 | 2,4-toluylene diisocyanate | 5 | 10 | 10 | 75 | 1.1 |
| 26 | 4,4'-diphenylmethane diisocyanate | 5 | 10 | 15 | 75 | 1.2 |
| 27 | 1,6-hexamethylene diisocyanate | 5 | 10 | 10 | 75 | 1.7 |
| 28 | Isomeric mixture of 2, 4 and 2, 6-toluylene diisocyanate (80:20% by weight). | 5 | 10 | 10 | 75 | 1.0 |
| 29 | 1,6-hexamethylene diisocyanate | 5 | 10 | 15 | 75 | 2.9 |
| 30 | 4,4'-diphenylmethane diisocyanate | 5 | 10 | 10 | 60 | 1.0 |
| 31 | 1,6-hexamethylene diisocyanate | 5 | 10 | 10 | 80 | 1.0 |
| 32 | do | 5 | 10 | 40 | 60 | 2.9 |
| 33 | 4,4'-diphenylmethane diisocyanate | 5 | 10 | 10 | 60 | 2.1 |

[1] Solution at approximately 60° C.

mg./h.cm.$^2$ and can withstand being bent 200,000 in the Bally Flexometer.

Example 36

In a manner analogous to that used in example 35, about 40 parts of ethyl acetate and about 100 parts by volume of cleaning petrol (aliphatic hydrocarbon mixture of b.p. 100°–140° C.) are dispersed in about 62 parts (10 mmol NH$_2$) of the NH$_2$-containing prepolymer prepared according to B 21. After the addition of a mixture of about 50 parts by volume of cleaning petrol and about 50 parts by volume of a 0.2 molar solution in benzene of a prepolymer A prepared according to A 19, the reaction mixture is stirred for about 10 seconds and poured on to a glass plate of 680 cm.$^2$ in area, and polyaddition is completed at room temperature with concomitant evaporation of the solvent. A microporous film is obtained which has a permeability to water vapor of 7.1 mg./h./cm.$^2$.

Example 37

About 30 parts by volume of ethylene glycol are dispersed in about 41 parts (14.9 mmol NH$_2$) of a prepolymer prepared according to B 17, and are added to the dispersion which is in the process of formation of about 25 parts by volume (5 mmol NCO) of a 0.2 molar solution in benzene of the prepolymer prepared according to A 3. The reaction mixture is poured on to glass plates 680 cm.$^2$ in area. The mixture is heated at about 80° C. for about 2 hours and is then cooled to room temperature, and the glycol is removed by washing with water. After drying, a microporous sheet structure is obtained which has a permeability to water vapor of 4.4 mg./h./cm.$^2$.

Example 38

In a manner analogous to example 37, a dispersion of about 44 parts (5 mmol NH$_2$) of a product prepared according to B 12 and about 100 parts by volume of ethylene glycol are reacted with about 25 parts by volume (5 mmol NCO) of a 0.2 molar solution in benzene of the product prepared according to A 19, and the reaction mixture is stirred for about 10 seconds and is then poured on to metal plates 700 cm.$^2$ in area and left to stand for about 4 hours at about 20° C. After washing with water to remove glycol and drying, a microporous sheet structure remains which has a permeability to water vapor of 5.6 mg./h./cm.$^2$

Example 39

About 50.5 parts (10 mmol NH$_2$) of a prepolymer prepared according to B 23 are mixed with about 1 part of copper phthalocyanine, about 50 parts of tetrahydrofuran, and about 50 parts of benzene and about 40 parts of a 12 percent solution in acetone of a cellulose acetate (containing 53.5 percent acetic acid). A dispersion is formed by the addition of about 250 parts by volume of water. About 10 parts by volume of 0.5 molar (10 mmol NCO) solution in benzene of 4,4'-diphenylmethane diisocyanate are added to the dispersion which is then stirred for about 5 seconds and poured on to a glass plate 680 cm.$^2$ in area, and polyaddition heating the surrounding air to about 75° C., the solvent being evaporated. The resulting microporous film has a permeability to water vapor of 1.4 mg./h./cm.$^2$ Examples 40 and 41 are carried out in a manner analogous to example 39.

| Example | Prepolymer B used | Quantity of prepolymer B (parts) | NH$_2$, mmol | Solvent added | Quantity of solvent (parts) | Quantity of water dispersed (parts by volume) | Polymer used | Solvent for the polymers used |
|---|---|---|---|---|---|---|---|---|
| 40 | B 23 | 50.5 | 10 | Benzene | 80 | 200 | Polyvinyl chloride K-value 55, Polyvinyl acetate molecular weight 200,000. | Tetrahydrofuran. Do. |
| 41 | B 23 | 50.5 | 10 | Tetrahydrofuran, Benzene | 30, 50 | 250 | Thermoplastic, partially hydrolyzed cellulose acetate. | Tetrahydrofuran. |

| Example | Concentration of the polymers in the solvent (percent) | Quantity of solvent for the polymer used (parts) | Polyisocyanate | 0.5 molar solution of prepolymer A in benzene (parts by volume) | NCO of solution of prepolymer A, mmol | Stirring time (sec.) | Heating temp. (° C.) | Permeability to water vapor (mg. h./cm.$^2$) |
|---|---|---|---|---|---|---|---|---|
| 40 | 30 | 20 | 4,4'-diphenylmethane diisocyanate. | 10 | 10 | 6 | 75 | 6.2 |
| 41 | 30 / 10 | 20 / 40 | 4,4'-diphenylmethane diisocyanate. | 10 | 10 | 5 | 75 | 0.9 |

Example 42

About 37.5 parts (10 mmol NH$_2$) of a prepolymer prepared according to B 22 are diluted with about 130 parts of toluene. About 3 parts of a commercial filler of precipitated silicic acid (pH–5.5–, particle size below 20$\mu$; consisting of 90 percent SiO$_2$ and calcium silicate), moistened with about 10 parts of toluene and treated with about 10 parts of water, are added to the solution of prepolymer B. After about 180 parts by volume of water have been dispersed in this precipitate, about 20 parts by volume (20 mmol NCO) of a 1-molar solution in ethyl acetate of a prepolymer according to A 22 are added. The reaction mixture is stirred for about 40 seconds. It is then applied to glass plates 680 cm.$^2$ in area, polyaddition is completed at about 60° C., and the solvent is evaporated. The resulting microporous film has a permeability to water vapor of 5.9 mg./h./cm.$^2$

Example 43

About 54 parts (10 mmol NH$_2$) of a prepolymer prepared according to B 28 are diluted with about 80 parts of benzene, and a mixture of about 0.4 parts of gas soot, about 1 part of paraformaldehyde (particle size 5$\mu$) and about 0.2 parts of oxalic acid is added. After the incorporation of about 400 parts by volume of water by dispersion, about 10 parts by volume of 0.5 molar solution in benzene of 4,4'-diphenylmethane diisocyanate are added. The reaction mixture is then stirred for about 10 seconds and is poured on to glass plates 680 cm.$^2$ in area. After completion of polyaddition and evaporation of the solvent at about 75° C., the permeability to water vapor of the microporous sheet structure is found to be 6.6 mg./h./cm.$^2$.

Example 44

In a manner analogous to example 43, about 54 parts (10 mmol NH$_2$) of a prepolymer prepared according to B 28 are diluted with about 50 parts of benzene. The solution has a viscosity of 7 seconds (Ford beaker, 6 mm. nozzle). On the addition of water, the viscosity of the solution increases as follows:

| Viscosity | Quantity of water (parts by volume) |
|---|---|
| 9 | 30 |
| 14.5 | 80 |
| 32 | 140 |
| 180 | 200 |

After the addition of a further 50 parts by volume of water (total amount about 230 parts by volume), the dispersion breaks up and becomes highly fluid (dispersion of the organic phase in water). For this reason, about 30 parts of benzene are placed in another glass beaker and the dispersion which has broken up is slowly introduced into the benzene with vigorous stirring. A thick dispersion of water in the organic phase is again obtained. After the addition of about 0.5 part os a yellow iron oxide pigment, about 12.5 by volume (12.5 mmol NCO) of 0.5 molar solution of 4,4'-diphenylmethane diisocyanate in benzene are added, and after stirring for about 12 seconds, the reaction mixture is poured on to glass plates 200,000 cm.² in area. After it has been heated at about 80° C. until reaction is complete, a microporous sheet structure is obtained which has a permeability to water vapor of 0.7 mg./h./cm².

Example 45

In a manner analogous to example 44, about 80 parts of benzene are added to about 54 parts (10 mmol NH₂) of the prepolymer prepared according to B 28, and the viscosity is determined. The following viscosities are obtained on addition of water:

| Viscosity in Ford beakers 6 mm. nozzle (seconds) | Quantity of water (parts by volume) |
| --- | --- |
| 6 | 0 |
| 6.5 | 25 |
| 7 | 50 |
| 7.5 | 75 |
| 8.5 | 100 |
| 10 | 125 |
| 11 | 150 |
| 12 | 175 |
| 15 | 200 |
| 19 | 225 |
| 26 | 250 |
| 43 | 275 |
| 100 | 300 |

About 0.5 parts of an orange colored lead chromate pigment is added to the dispersion, about 15 parts by volume of a 0.5 molar solution of 1,5-naphthylene diisocyanate in tetrahydrofuran are added, and after stirring for about 30 seconds the reaction mixture is poured on to glass plates 680 cm.² in area and heated at about 80° C. until reaction is completed, when the solvent is evaporated. The resulting film has a permeability to water vapor of 0.7 mg./h./cm.².

Example 46

About 25.6 parts (10 mmol NH₂) of a prepolymer prepared according to B 24 are mixed with about 3 parts of o-benzylhydroxydiphenyl polyglycol ether and about 25 parts of methylene chloride. After about 100 parts by volume of water have been dispersed in this mixture, about 50 parts by volume (10 mmol NCO) of a 0.2 molar solution in benzene of the prepolymer prepared according to A 3 are added, and after stirring for about 25 seconds, the reaction mixture is poured on to glass plates 680 cm.² in area, and polyaddition is completed at about 80° C., the solvents evaporating at the same time. A microporous sheet structure is formed which has a permeability to water vapor of 1.8 mg./h./cm.²

Example 47

In a manner analogous to example 46, about 30 parts of benzene are added to about 11.5 parts (10 mmol NH₂) of a prepolymer prepared according to B 3, and about 70 parts by volume of water are dispersed in this mixture. About 20 parts of a 20 percent aqueous solution of o-benzyl-hydroxydiphenyl polyglycol ether are added to about 50 parts by volume (10 mmol NCO) of a 0.2 molar solution in benzene of a prepolymer prepared according to A 1, and about 180 parts by volume of water are dispersed in this. This dispersion of prepolymer A is introduced into the dispersion of prepolymer B, and after stirring for about 8 seconds the reaction mixture is poured on to glass plates 680 cm.² in area. Polyaddition is completed at room temperature and the solvents are evaporated. A microporous sheet structure is obtained which has a permeability to water vapor of 13.4 mg./h./cm.²

Example 48

About 250 parts by volume of water are dispersed in about 100 parts by volume of 0.5 molar solution in benzene of prepolymer B 32 (50 mmol NH) and about 50 parts of benzene. About 50 parts by volume of a unimolar solution of prepolymer A 22 (50 mmol NCO) are stirred into this dispersion which is then stirred for a further 5 seconds, and the dispersion, which becomes viscous, is applied to glass plates 680 cm.² in area. After completion of polyaddition and evaporation of the solvent at about 75° C. in a circulating air cupboard, a microporous film is obtained which has a permeability to water vapor of 8.6 mg./h./cm.².

Example 49

About 100 parts by volume of water are dispersed in about 50 parts by volume of a 0.5 molar solution in benzene of prepolymer B 32 (25 mmol NH). About 50 parts by volume of a molar solution of an isomeric mixture of 80 percent 2,4- and 20 percent, 2,6-toluylene diisocyanate in ethyl acetate are added. The reaction mixture is stirred for about 10 seconds and then applied to glass plates 680 cm.² in area. After completion of the polyaddition and evaporation of the solvents at about 75° C., in a circulating air cupboard, a microporous film is obtained which has a permeability to water vapor of 4.9 mg./h./cm.².

Example 50

About 20 parts of a 2-molar aqueous solution of hydrazine (40 mmol NH₂) and about 180 parts by volume of water are dispersed in about 30 parts of di-n-propyl ether and about 50 parts by volume of a 0.5 molar solution of prepolymer B 33 (25 mmol NH). After the addition of about 6.3 parts of a mixture of about 4 parts of 2,4-and about one part of 2,6-toluylene diisocyanate (70 mmol NCO) in about 10 parts of di-n-propyl ether, the reaction mixture is stirred for a further 8 seconds and then applied to glass plates 700 cm.² in area. Polyaddition is completed at about 60° C. and the solvents are evaporated. The resulting microporous film has a permeability to water vapor of 0.5 mg./h./cm.²

Example 51

About 80 parts by volume of water are dispersed in a mixture of about 50 parts of a 30 percent solution in benzene of a product prepared according to B 34 and about 30 parts of a 20 percent solution in methylene chloride of a polycarbonate of 4,4'-dihydroxy-diphenyl-2,2-propane, about 15 parts by volume of a molar solution (15 mmol NCO) in ethyl acetate of a product according to A 22 are added. After stirring for about 15 seconds the reaction mixture is poured on to a commercial removable backing paper (for polyurethanes) 1,000 cm.² in area, polyaddition is completed in a circulating air cupboard at 75° C., and the solvents are evaporated.

The resulting microporous film has a permeability to water vapor of 1.4 mg./h./cm.².

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A process for making a microporous sheet structure which is permeable to water vapor which comprises dispersing into an organic polyamine having a molecular weight of from about 350 to about 6,000, water or an organic nonsolvent to form a dispersion of water or organic nonsolvent in the polyamine, mixing a substantially equivalent amount of an organic polyisocyanate with the resulting dispersion, applying the resulting dispersion of reacting organic polyisocyanate and polyamine to a substrate, completing reaction of the organic polyisocyanate with the polyamine while evaporating the water or nonsolvent therefrom, said nonsolvent being a nonsolvent for both the polyamine and the reaction product.

2. The process of claim 1 wherein the organic polyisocyanate is dissolved in an organic solvent therefor prior to mixing.

3. The process of claim 1 wherein the organic polyisocyanate is selected from the group consisting of monomeric organic polyisocyanates, NCO terminated prepolymers prepared by reacting an excess of a monomeric polyisocyanate with an organic compound having active hydrogen atoms that are reactive with NCO groups and mixtures thereof.

4. The process of claim 1 wherein the organic polyamine having a molecular weight of from about 350 to about 6,000 and at least two amino groups is mixed with lower molecular weight polyamines, the quantity of which does not exceed 50 mols percent based on the high molecular weight polyamines.

5. The process of claim 1 wherein both the organic polyisocyanate and the polyamine are dissolved or dispersed in organic solvents therefor.

6. The process of claim 1 wherein the organic polyamine having a molecular weight of from about 350 to about 6,000 and at least two amino groups is a reaction product of an excess of a low molecular polyamine or hydrazine with an isocyanato terminated prepolymer.

7. The process of claim 1 wherein the polyamine is dissolved or dispersed in an organic solvent therefor prior to mixing.

8. The process of claim 1 wherein (b) is dispersed in the nonsolvent before it is mixed with (a).

9. The process of claim 1 wherein water is dispersed into the organic polyamine.

10. A microporous sheet structure prepared by the process of claim 1.

11. The process of claim 1 wherein a nonsolvent for the polyamine is dispersed into the polyamine.

12. The process of claim 11 wherein the polyamine is dissolved in a solvent which is evaporated with the nonsolvent when the reaction is substantially complete.

13. The process of claim 12 wherein the vaporization number of the nonsolvent is at least 1½ times that of the solvent.

* * * * *